(12) United States Patent
Pineda et al.

(10) Patent No.: US 6,389,377 B1
(45) Date of Patent: May 14, 2002

(54) METHODS AND APPARATUS FOR ACOUSTIC TRANSIENT PROCESSING

(75) Inventors: Fernando J. Pineda; Gert Cauwenberghs; R. Timothy Edwards, all of Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 09/203,032

(22) Filed: Dec. 1, 1998

Related U.S. Application Data
(60) Provisional application No. 60/067,068, filed on Dec. 1, 1997.

(51) Int. Cl.$^7$ ............................................... G06F 9/455
(52) U.S. Cl. .................................. 703/4; 703/2; 716/4
(58) Field of Search ...................... 703/4, 2; 340/552; 347/15; 716/1, 4, 5

(56) References Cited

U.S. PATENT DOCUMENTS

| | | | | |
|---|---|---|---|---|
| 4,107,659 A | * | 8/1978 | Massa | ......................... 340/552 |
| 5,550,569 A | * | 8/1996 | Wright | ......................... 347/15 |

OTHER PUBLICATIONS

R.T. Edwards et al., *A Mixed–Signal Correlator for Acoustic Transient Classification*, Proceedings of 1997 IEEE Int'l Symposium on Circuits and Systems, ISCAS '97, vol. 1, Jun. 9–12, 1997, pp. 621–624.*
R.T Edwards et al., *Mixed–Mode Correlator for Micropower Acoustic Transient Classification*, IEEE Journal of Solid–m-State Circuits, vol. 34, No. 10, Oct. 1999, pp. 1367–1372.*
B. Broder et al., *Multiresolution Modeling for the Analysis of Acoustic Transients*, OCEANS '92, Mastering the Oceans Through Technology, Proceedings, vol. 1, pp. 62–67.*
T. Hemminger et al., *Detection and Classification of Underwater Acoustic Transients Using Neural Networks*, IEEE Transactions on Neural Networks, vol. 5, No. 5, Sep. 1994, pp. 712–718.*
M.K. Shields et al., *A Hidden Markov Model Approach to the Classification of Acoustic Transients*, 1990 Int'l Conference on Acoustics, Speech, and Signal Processing, ICASSP–90, vol. 5, pp. 2731–2734.*
S.–K. Sin et al., *A New Design Methodology for Optimal Interpolative Neural Networks with Application to the Localization and Classification of Acoustic Transients*, IEEE Conference on Neural Networks for Ocean Engineering, 1991, pp. 329–340.*
Pineda, F.J., Ryals, K., Steigerwald, D. and Furth, P., (1995). "Acoustic Transient Processing using the Hopkins Electronic Ear", World Conference on Neural Networks 1995, Washington D.C.

* cited by examiner

*Primary Examiner*—Rrussell W. Frejd
(74) *Attorney, Agent, or Firm*—Francis A. Cooch

(57) ABSTRACT

Method and apparatus for using current-mode analog circuits to compute the correlation between an auditory input signal in the time-frequency domain and a stored binary template. By using massively parallel computation, circuits made of relatively imprecise analog components are able to accurately classify transient events, are competitive with high-performance DSP systems, and operate with much smaller power requirements.

8 Claims, 4 Drawing Sheets

METHODS AND APPARATUS FOR ACOUSTIC TRANSIENT PROCESSING

CROSS-REFERENCE TO RELATED APPLICATION

This application claims the benefit of U.S. Provisional application Ser. No. 60/067,068, filed on Dec. 1, 1997.

BACKGROUND OF THE INVENTION

The invention relates to signal processing and, more particularly, to a mixed-mode very-large-scale integration (VLSI) architecture and methods for real-time classification of acoustic transients.

Acoustic transients, short, impulsive bursts of acoustic energy that last between 10 and 100 ms, are a rich source of information in the natural world, and the ability to process them in real time provides a competitive advantage to species. As a result, humans, like other animals, have evolved the ability to quickly and economically process acoustic transients.

In the digital world of algorithms and computers, analogous evolutionary forces have caused engineers to develop powerful digital signal processing (DSP) algorithms for classification of acoustic signals on fast DSP engines. Using modern signal processing techniques to recognize acoustic transients in real time is straightforward on modern processors. The challenge of extracting information from signals has been met by powerful mathematical techniques such as wavelet analysis and hidden Markov models. The need for real-time performance has been met by fast and powerful central processing units (CPUs) and special-purpose DSP chips.

Despite the above, a closer look at the DSP solutions reveals that the burden of real-time processing is borne by increasingly powerful digital processors. The price for success is measured in terms of power dissipation and complexity. Power dissipation scales linearly with the processor's clock rate. Thus, all else being equal, a 100-MHz processor dissipates 1000 times more power than a 100-kHz processor. Each bump up in clock rate requires increasingly heroic methods to control power dissipation.

Complexity can be measured by the number of cycles required to perform a calculation and by the surface area of the chip. Increasingly complex algorithms create pressure to increase the complexity of the processor and thus the area of a chip. The problem of greater chip area can be overcome by scaling down the feature size of the fabrication process, but scaling also has physical limits. Moreover, as the feature size scales down, the fabrication process itself becomes more difficult and exacting.

All of this contrasts sharply with nature's solution. The characteristics and advantages of nature's acoustic processing algorithms are well documented. Natural systems process acoustic information in real time, with precision and reliability, while dissipating minuscule amounts of energy. Nature accomplishes this with slow and unreliable devices, i.e., neurons. Biological hardware has no clock but typical time scales are measured in fractions of milliseconds. In effect, biological hardware runs at a 1- to 10-kHz clock rate.

If it were possible to engineer acoustic processors with biological levels of performance and power requirements, a large number of new applications would become feasible. Intelligence based on acoustic pattern recognition could be built into appliances, telephones, and credit cards. Cellular phones could take spoken commands. Smart credit cards could recognize not only passwords, but also the speaker. Digital watches and calculators that run for years on button cells could understand a small vocabulary of spoken words. Self-diagnosing machines could recognize acoustic transients caused by state changes and wear.

Motivated by the observation that biological systems perform very sophisticated tasks while making low demands on power consumption and component precision, artificial devices can be developed that perform as competently as biological systems while requiring minimal resources. The long-term goal is to build pattern recognition engines whose performance characteristics rival those of biological systems. To be more specific, acoustic processing engines with the following characteristics can be built:

Real-time operation, so that typical transients are recognized in about 100 ms or less.

High correct classification rates (near 95%) on hundreds of transient classes while achieving low false alarm rates.

Implementation of such engines with the highly mismatched metal-oxide-silicon (MOS) transistors that are typical in modern analog VLSI fabrication processes (feature size <1.2 $\mu$m).

Power dissipation on the order of a milliwatt or less. This requires subthreshold current-mode circuits. Currents in such circuits are in the 0.1- to 10-nA range, while voltage swings are in the 100-mV range. Clock rates will be tens of kilohertz or less.

One solution to the above would be a practical architecture for performing real-time recognition of acoustic transients by means of a correlation-based algorithm. In other words, the algorithm would perform pattern recognition by correlating an incoming signal with a stored template. However, correlation-based algorithms are generally believed to be so computationally intensive that they cannot be used for real-time applications except in conjunction with fast DSP chips.

Traditionally, correlation in analog VLSI poses two fundamental implementation challenges: first, the problem of template storage; second, the problem of accurate analog multiplication. Both problems can be solved by building sufficiently complex circuits. For example, analog values can be stored by sample-and-hold circuits or by storing digital values and converting them into analog values via digital-to-analog converters. These solutions are generally inferior to digital correlation algorithms because they lead to analog processors that are large compared with their digital counterparts.

Another, more compact solution to the template storage problem is to employ the recently developed floating gate devices. Presently, such devices can store precise analog values for years without significant degradation. Moreover, this approach can result in very compact devices. Unfortunately, programming floating gate devices is not particularly easy. It is relatively slow and requires high voltage. Furthermore, the floating gate degrades each time it is reprogrammed. The fabrication of high-quality floating gates also requires advanced fabrication processes that may not be compatible with circuits for other kinds of on-chip processing.

Finally, even if the analog storage problem could be solved effectively, the problem of building accurate analog-analog multipliers remains. High-quality analog multipliers are notoriously difficult to build. Effective solutions require considerable area on the chip.

One solution to the above problems is to sidestep them completely and to develop an algorithm and architecture that require neither analog storage nor analog multiplication. One instance of this approach is to binarize the input and then to correlate it with a binary template. Thus, the correlations can be performed by simple "XOR" gates. This approach is compact and fast. Thus, there remains a need for analog VLSI devices for real-time classification of acoustic transients that provide a high level of classification and are small and relatively simple to build.

SUMMARY OF THE INVENTION

The above problems are solved by the invention, a hybrid approach that replaces analog-analog multiplication with analog-binary multiplication. In mixed-mode hardware this operation corresponds to simple binary multiplexing. The algorithm and architecture of the invention are expected to perform a correlation calculation on a special-purpose parallel analog VLSI chip, using a slow clock (about 10 kHz) and with just a few milliwatts of power dissipation.

Many time-based classification systems compute the correlation of an incoming discrete-time signal or signals with a predetermined template. While for speech and other complex long-term signals it is necessary to perform dynamic time warping (DTW) or similar weighting of the incoming signal, for transients, a simple correlation in the time-frequency domain yields accurate classification results.

A general form of the simple correlation is $$c_z[t] = \sum_{m=1}^{M} \sum_{n=1}^{N} x[t-n, m]p_z[n, m] \tag{1}$$

where M is the number of frequency channels of the input, N is the maximum number of time bins in the window, x is the array of input signals split into frequency bands, $p_z$ is the matrix of template pattern values for pattern z, and t is the current time. This formula produces a running correlation $c_z(t)$ of the input array with the template z.

For large M and N, this algorithm can be expensive to execute on a DSP in terms of speed and power requirements. However, the approach of the invention lends itself elegantly to low-power parallel analog computation in the form of MOS transistor circuits operating primarily in the subthreshold mode.

The algorithm of the invention is a set of modifications to the algorithm of Equation (1). First, the input is normalized, which is essential for the steps which follow. Next, the input and template are transformed into a zero-mean representation by taking the difference of successive samples, the difference between neighboring channels, or some combination thereof. In this form, the template values can be made binary without significantly increasing classification error rates as determined experimentally. Finally, the differencing operation is moved to the output, yielding the simplest possible form of the architecture.

Assume the input y to the system is a sampled, continuous-valued acoustic signal, split into M frequency bands. The (rectified) energy envelope for each band, denoted x, is computed and then these system inputs are normalize by the function $$x[t, m] = \frac{y[t, m]}{\theta + \sum_{k=1}^{M} y[t, k]}, \tag{2}$$

where θ is a threshold value included to suppress noise during quiet intervals in the input. The normalized input representation is essential to significantly simplify the pattern classifier algorithm for analog inputs, greatly reducing the size and complexity of the hardware implementation but not degrading the classification result.

Several steps are necessary to make the computation less expensive. First, zero-mean transformed input is compared directly to the zero-mean transformed template. This has the effect of subtracting a constant from the result but otherwise does not affect the computation. The template is replaced by the sign of the transformed template. Thus, $$c_z[t] = \sum_{m=1}^{M} \sum_{n=1}^{N} x'(t-n, m)p'_z[n, m] \tag{3}$$

where x'(t−n,m)=x(t−n,m)−x(t−n,m−1) for channel differencing and $$p'_z[n,m] = \text{sign}(p_z[n,m] - p_z[n,m-1]). \tag{4}$$

It has been shown that binarization of the template has a negligible effect on classification performance. Note that this result does not hold if the input and template are not transformed into a zero-mean representation.

With this major simplification of the algorithm, the multiplication can be reduced to a multiplexing function. The required normalization of the input allows a further simplification that does not affect system performance, in which the template values are made binary [0,1] rather than binary [−1,1].

If time differencing is used for the zero-mean representation, another simplification is possible, noting that the time difference commutes with the summation, so that Equation (1) can be written $$c_z[t] = \sum_{m=1}^{M} \sum_{n=1}^{N} x[t-n, m]p'_z[n, m] - \sum_{m=1}^{M} \sum_{n=1}^{N} x[(t-1)-n, m]p'_z[n, m]. \tag{5}$$

If we let $$c'_z[t] = \sum_{m=1}^{M} \sum_{n=1}^{N} x[t-n, m]p'_z[n, m], \tag{6}$$

then $$c_z[t] = c'_z[t] - c'_z[t-1]. \tag{7}$$

In this forms the time difference can be computed at the output of the correlator rather than at the inputs, yielding three advantages:

1. Only one difference rather than M differences need to be computed.
2. Architecturally, the algorithm is less affected by device mismatch when computing the output based on the difference of successive outputs rather than the absolute value of the output.
3. Most importantly, since the inputs x are rectified, the product xp' (when p' is binary [0,1] is always positive and equals either x or zero, which allows us to conveniently implement the entire convolution as an array of simple on/off current switches carrying current in one direction only.

With the invention, a high level of classification performance on real-world data can be achieved with no measurable loss of performance in comparison with a traditional, computationally intensive correlation algorithm. Moreover, the mixed-mode architecture of the invention is not significantly harder to implement than the binary-binary correlation. In the acoustic case, the approach requires neither digital-to-analog nor analog-to-digital converters nor the storage of analog values. The algorithm leads to a correlator whose computing surface bears a strong resemblance to conventional dynamic random access memory (RAM).

DETAILED DESCRIPTION

The acoustic transient data used in the development of the invention consisted of isolated bangs, claps, clicks, cracks, dinks, pings, pops, slaps, smacks, snaps, thuds, and whacks that were recorded on digital audio tape in an office environment. The ambient noise level was controlled but was typical of a single-occupant office. Approximately 221 transients in 10 classes were collected.

Figure 1:
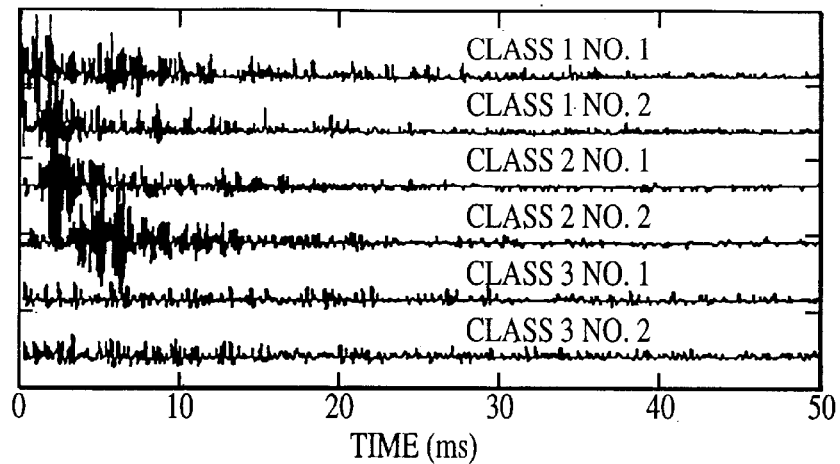
FIG. 1 illustrates six acoustic transients from three classes, the similarity between classes, and the dissimilarity within classes.

FIG. 1 shows six examples from three classes. As can be seen, most of the energy in one of the typical transients was dissipated in the first 10 ms. The rest was dissipated over the course of about 100 ms. The transients had durations of about 20 to 100 ms. There was considerable in-class and between-class variability in duration. The duration of a transient was determined automatically by a segmentation algorithm, described below. The segmentation algorithm was also used to align the templates in the correlation calculations.

In a conventional correlation algorithm (baseline algorithm) used to classify data, as in many biologically motivated acoustic processing algorithms, the preprocessing steps include time-frequency analysis, rectification, and smoothing and compression via a nonlinearity. Classification was performed by correlation against a template that represented a particular class followed by selection of the class with the greatest correlation. Creating the templates also required a "training" step. This training step is described below.

Time-frequency analysis for the baseline algorithm and the simulations was performed by a low-power (5.5-mW) analog VLSI filter bank intended to mimic the processing performed by the mammalian cochlea. This real-time device created a time-frequency representation that would ordinarily require hours of computation on a high-speed workstation.

The time-frequency representation produced by the filter bank was qualitatively similar to that produced by a wavelet transformation. The center frequencies and Q-factors of each channel were uniformly spaced in log space. The low-frequency channel was tuned to a center frequency of 100 Hz and a Q-factor of 1.0, while the high-frequency channel was tuned to a center frequency of 6000 Hz and a Q-factor of 3.5. There were 31 output channels.

The 31-channel cochlear output was digitized and stored on disk at a raw rate of 256,000 samples per second. This raw rate was distributed over 32 channels, at rates appropriate for each channel (six rates were used, 1 kHz for the lowest-frequency channels up to 32 kHz for the highest-frequency channels and the unfiltered channel).

Figure 2:
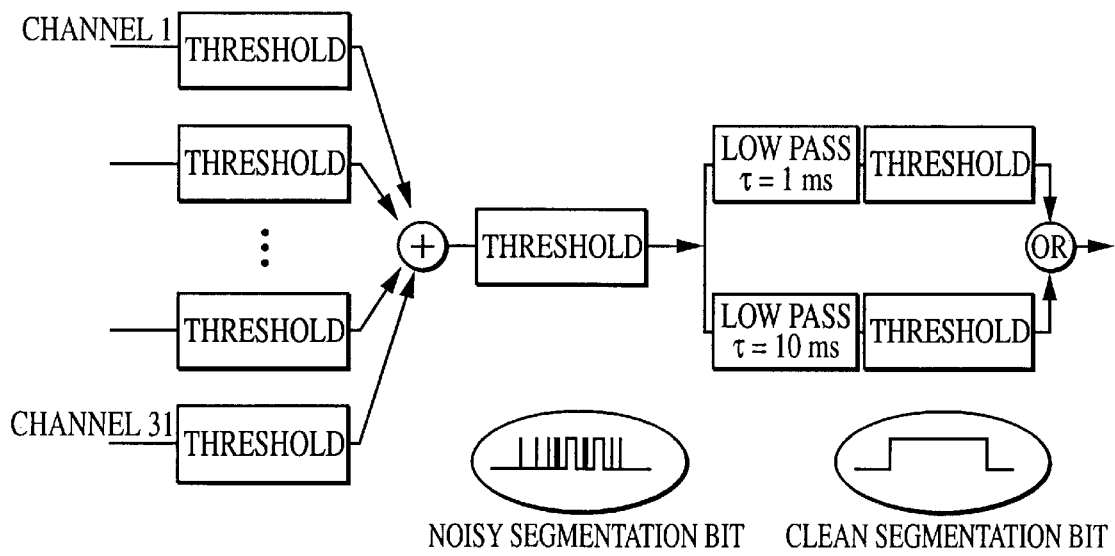
FIG. 2 is a schematic of the segmenter network ($\tau$ indicates the time scale of the low-pass filters).

The template calculation and classification algorithm can operate without segmented input; however, a reliable segmenter allows simple averaging to be used for template calculations, and can make the classification more robust for isolated transient inputs. Because the transients were isolated and the noise level was low, a simple segmenter was adequate. FIG. 2 shows a block diagram of the segmenter.

The raw cochlear output of each channel was high-pass filtered to subtract the mean and then was rectified. The signal in each channel was then passed through a threshold function. In principle, each channel can have its own threshold, but in practice, the same threshold was used for all channels. The resulting bits were summed and again passed through a threshold function. The result is a noisy segmentation bit that was set to 1 if two or more channels exceeded their thresholds.

A clean segmentation bit was generated from the noisy segmentation bit by passing the noisy segmentation bit through two parallel channels. Each channel first low-pass filtered the noisy segmentation bit and then passed it through a threshold function. The first channel used a 10-ms low-pass filter to fill in dropouts; the second channel used a faster (1-ms) low-pass filter to catch the onset of a transient. The outputs of the two channels were passed through an "OR" gate to produce a clean segmentation bit.

Essentially, the segmenter was a three-layer neural network composed of linear threshold units. The network has four adjustable thresholds that were determined in an ad hoc manner so as to maximize the number of true transients that are properly segmented while minimizing the number of transients missed or cut in half. No effort was made to control the duration of the segments generated by the segmenter.

A software simulation of the segmenter was used to segment the raw cochlear output files into events that were then written out as smaller disk files. Segmenting a 15-s stretch of raw data took about 1 h of computation on an RS/6000 workstation (rated at 10 MFLOPS). If this segmenter were realized as an analog circuit, it would operate in real time. The segmented files were used as the starting point for what is described below.

The raw output of the filter bank was rectified and smoothed with a single pole filter and subsequently normalized. Smoothing was done with the same time scale (1 ms) in all frequency channels. The instantaneous output of the normalizer was $$\hat{X}(t) = \frac{X(t)}{\theta + \|X(t)\|}, \tag{8}$$

where X(t) was the instantaneous vector of rectified and smoothed channel data and $\theta$ was a small positive constant whose purpose was to prevent the normalization stage from amplifying noise in the absence of a transient signal. With this normalization we have $$\|\hat{X}(t)\|_1 \approx 0 \text{ if } \|X(t)\|_1 << \theta, \tag{9}$$

and $$\|\hat{X}(t)\|_1 \approx 1 \text{ if } \|X(t)\|_1 \gg \theta, \tag{10}$$

Thus, θ effectively determined a soft input threshold that transients must have exceeded if they were to be normalized and passed on to higher-level processing.

Figure 3:
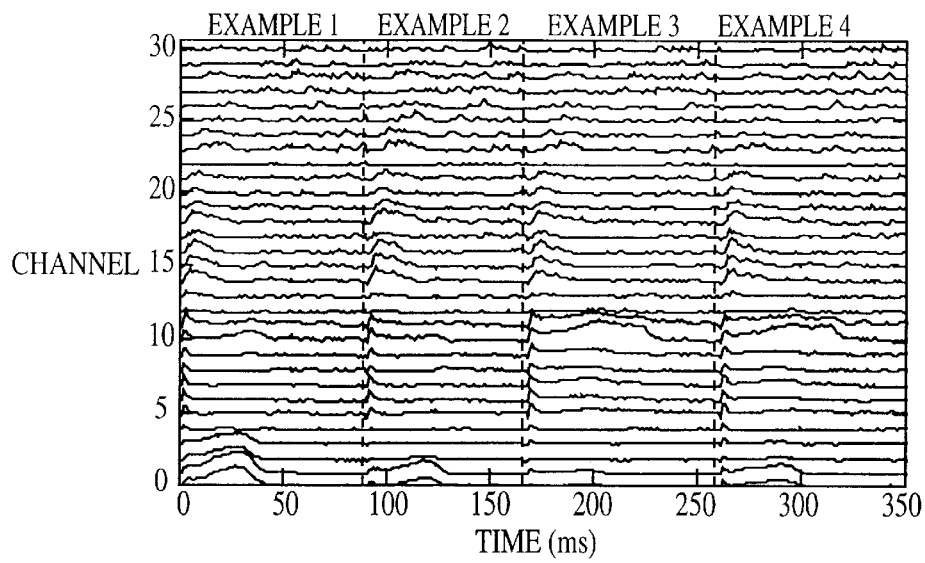
FIG. 3 illustrates the normalized representation of the first four examples from a typical transient class.

A sequence of normalized vectors over a time window of length T was used as the feature vector for the correlation and classification stages of the baseline algorithm. FIG. 3 shows the normalized feature vectors corresponding to the first four examples of a typical class. These have been concatenated into a single plot.

The feature vectors were correlated in the time-frequency domain against a set of k time-frequency templates. The kth feature vector template was precalculated by averaging over an ensemble of normalized feature vectors from the kth class. Thus, if $C_k$ represented the kth transient class and $<>_k$ represented an average over the elements in a class, e.g., $$<\hat{X}(t)>_k = E\{\hat{X}(t)|\hat{X}(t) \in C_k\}, \tag{11}$$

then the template was of the form $$b_k(t) = <\hat{X}(t)>_k. \tag{12}$$

The instantaneous output of the correlation stage is a k-dimensional vector c(t) whose kth component is $$c_k(t) \equiv \sum_{\tau=1}^{T} \hat{X}(t-\tau) \cdot b_k(\tau). \tag{13}$$

The time-frequency window over which the correlations were performed is of length T and is advanced by one time-step between correlation calculations.

The classification stage was a simple winner-take-all algorithm that assigns a class to the feature vector by picking the component of $c_k(T)$ that has the largest value at the appropriate time, $$\text{class} = \arg_k \max\{N_k c_k(t_{valid})\}. \tag{14}$$

where $N_k$ is a scalar for each class, determined experimentally, though for the baseline algorithm it has an analytic expression $$N_k = \sqrt{\Sigma \Sigma b_k}.$$

The segmenter was used to determine the time $t_{valid}$ when the output of the winner-take-all was to be used for classification. This corresponds to properly aligning the feature vector and the template.

Leave-one-out cross-validation was used to estimate the out-of-sample classification performance of all the algorithms described here. The rate of correct classification for the baseline algorithm was 96.4%. Of the 221 events detected and segmented, 8 were misclassified.

Taking a closer look at the correlation step above, it will be seen that the invention can perform classification without performing analog-analog multiplication and without having to store analog templates. To provide a better understanding of the invention, it will be presented in two steps. In the first step, a similarity measure that uses a binarized template will be constructed and this template will be shown to achieve a high level of classification performance. In the second step, it will be demonstrated how a slightly modified version of this similarity measure leads to a particularly elegant implementation in analog VLSI.

Examination of the normalized representation in FIG. 3 reveals that the features in the normalized representation vary slowly over time (compared with 1 ms). Moreover, adjacent frequency channels are very similar. Accordingly, the information content of any single time-frequency bin cannot be very high.

This observation motivates a highly compressed representation for the stored template. To be useful, such a representation must not degrade the classification rate. Accordingly, the vector c(t) is redefined to be the following similarity measure:

$$c_k(t) \equiv \sum_{\tau=1}^{T} \dot{\hat{X}}(t-\tau) \cdot b_k(\tau), \tag{15}$$

where the overdot represents a differentiation operation either with respect to channel (frequency), time or a combination thereof. In this expression, the time derivative of the normalized input vector is correlated against a binary valued [−1, +1] template vector b(τ).

This template vector is precomputed from examples by averaging over a set of typical transients and by setting each element of the template equal to one when the corresponding average is increasing in time and minus one if it is decreasing. In other words, the kth template is given by $$b_k(\tau) = \text{sgn}(<\dot{\hat{X}}(\tau)>_k), \tag{16}$$

where $$\text{sgn}(x) = x/|x| \tag{17}$$

is the vector-valued function that takes the sign of each component of x. Despite the fact that apparently a lot of information has been removed from the template, experiments with the office transients reveal that classification performance is not measurably degraded. In experiments the error rate was 94.6% or 12 errors.

To gain insight into this unexpectedly high level of performance, it is observed that differentiation throws out only an additive constant in each channel. This additive constant contains no information because the vectors are normalized.

Next, the effect of reducing the template vector to a single bit of information is considered. This effect can be understood by first considering the dot product of two random normalized vectors, x and y. If x and y are statistically independent, then the expected value of their dot product is zero, while the dot product of either vector with itself is just the Euclidean norm of the vector, e.g., $$x \cdot x = \|x\|_2. \tag{18}$$

Thus, if one normalizes with respect to the Euclidean norm, identical vectors will have dot products equal to one, whereas vectors that are statistically independent will have dot products close to zero. Now, consider the dot product between a random vector x and a binary vector whose components are just the signs of a random vector y. As before, if x and y are statistically independent, the dot product x·sgn(y) has an expected value near zero. Moreover, the dot product of a random vector x with sgn(x) will be equal to the 1-norm of x, i.e., $$x \cdot \text{sgn}(x) = \|x\|_1. \tag{19}$$

Thus, if one normalizes with respect to the 1-norm, identical vectors will have dot products equal to one, whereas vectors that are statistically independent will have overlaps close to zero.

This heuristic analysis leads to the insight that using binary template vectors amounts to performing classification based on a 1-norm rather than a more traditional 2-norm. One expects differences in classification rates, but these differences will depend on subtleties of the distribution of input vectors. Empirically, it is clear that for office acoustic transients these effects are insignificant.

There are two changes to the algorithm that allow it to be implemented in analog VLSI in a particularly elegant fashion. Observe that the need for 4-quadrant multiplication has been eliminated. Instead, one needs only to multiply a positive or negative real-valued X with a plus or minus one. In other words, the computational requirements have been reduced from 4-quadrant multiplication of two real-valued quantities to 4-quadrant multiplication of one real quantity with one binary-valued quantity. In what follows it is shown that the computation can be further reduced to a 1-quadrant multiplication of a positive real-value with zero or one.

First, observe that differentiation and addition commute; thus, Eq. 8 can be written as $$c_k(t) = \frac{d}{dt} \sum_{\tau=1}^{T} \hat{X}(t-\tau) \cdot b_k(\tau). \tag{20}$$

in the time domain or channel ($n$)      channel ($n-1$)
↓               ↓

$$c_k(t) = \sum_{\tau=1}^{T} \hat{X}(t-\tau) \cdot b_k(\tau) - \sum_{\tau=1}^{T} \hat{X}(t-\tau) \cdot b_k(\tau)$$

for channel difference computation

By performing the differentiation after performing the correlation, we only have to perform 2-quadrant multiplications of the positive components of X with plus or minus one.

The final simplification is achieved by observing that normalization implies that when one channel is increasing in amplitude, one or more other channels must be decreasing in amplitude so as to maintain the normalization. In effect, normalization introduces a new approximate symmetry that can be exploited to further simplify the computation. To see how this comes about, consider a positive vector x normalized with respect to the 1-norm, i.e., $$\sum_{\omega} x_\omega(t) = 1. \tag{21}$$

Taking the time derivative of this expression yields $$\sum_{\omega} \dot{x}_\omega(t) = 0. \tag{22}$$

This expression is also true for channel differences if the last channel wraps around to the first channel. This can be rewritten as the sum of positive and negative contributions $$\sum_{\dot{x}_\omega>0} \dot{x}_\omega(t) + \sum_{\dot{x}_\omega<0} \dot{x}_\omega(t) = 0, \tag{23}$$

which immediately implies $$\sum_{\dot{x}_\omega>0} \text{sgn}(\dot{x}_\omega)\dot{x}_\omega - \sum_{\dot{x}_\omega<0} \text{sgn}(\dot{x}_\omega)\dot{x}_\omega = 0. \tag{24}$$

In other words, the negative terms in x·sgn(x) exactly equal the positive terms. This means one need only accumulate the positive contributions and multiply by a factor of 2 to recover the complete result.

Empirically, we find that the difference between the [0,1] representation and the [−1, +1] representation remains a factor of 2 (to several digits of precision), even when the input vectors and the template vectors do not correspond to the same class. Classification experiments show that the out-of-sample performance of the [0,1] representation is identical to that of the [−1, +1] representation. Changing to the [0, 1] representation has no impact on the storage requirements, since both representations require the storage of a single bit per time-frequency bin. The big payoff is that the multiplication hardware is now very simple: 1-quadrant multiplication of a positive number with [0, 1] scarcely deserves the name multiplication, because in current-mode analog VLSI it can be implemented by a simple transistor on-off switch.

To summarize, a correlation algorithm has been developed that empirically performs as well as a baseline correlation algorithm but that requires only binary multiplexing to perform the correlation. Even with only 16 frequency channels and 64 time bins (1024-bits/template), the same level of performance is achievable as the original analog-analog correlation algorithm (31 frequency channels and 128 time bins).

Figure 4:
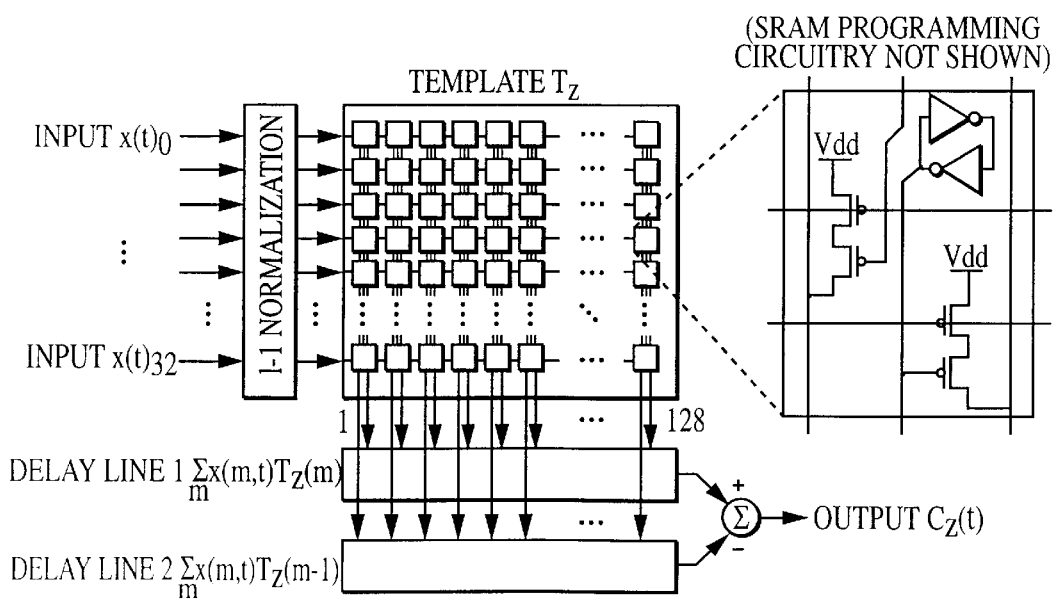
FIG. 4 illustrates a block diagram of the mixed-mode temporal current correlator. $\Delta$ and $\Sigma$ are the usual symbols for delay elements and additive elements, respectively.

FIG. 4 shows the system as presented. The rectified and smoothed frequency-analyzed signals are input from the left as currents. The currents are normalized before being fed into the correlator. Each template value is a single bit controlling a switch (multiplexer) which adds either zero or the unidirectional current input to the sum. The summed current is accumulated over time, with the difference taken at the output. The choice of an analog implementation stems from the ability to make such a system compact and extremely power-efficient. With a separate correlator circuit for each template, the system is fully parallel, and only about as complex as a RAM array.

Figure 5:
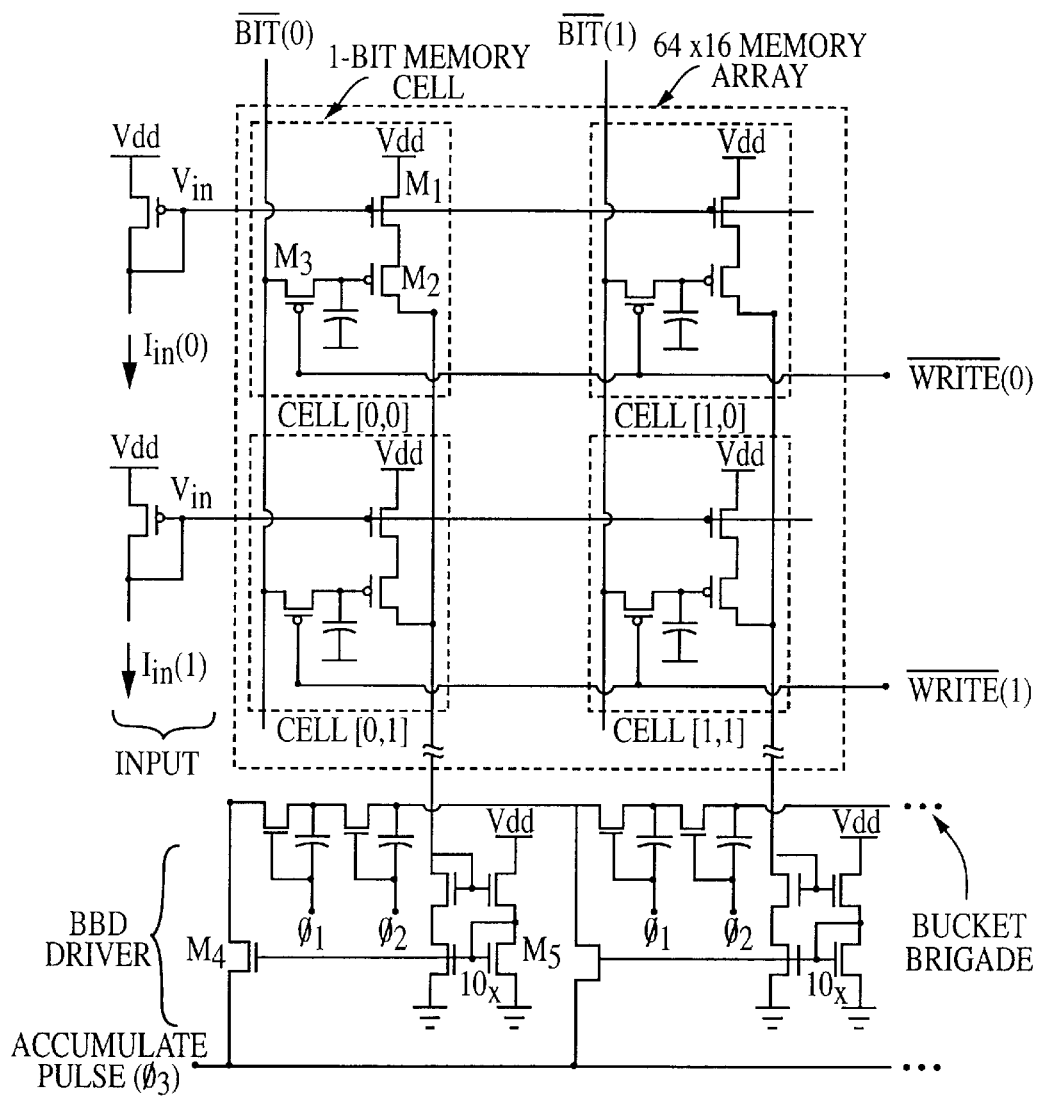
FIG. 5 illustrates the correlator array with dynamic RAM storage. (RAM refresh circuitry not shown.)

FIG. 5 shows a schematic of the correlator array for one template, minus the refresh and write circuitry for the dynamic memory. The correlator accepts inputs in the form of currents, one for each channel m. The diode-connected transistor at the input mirrors this current simultaneously to all cells across the array. To implement the summation over the m channels, the simplest form of summation available to analog circuits is utilized, that of summing currents onto a single line. Each cell in the array contains a single pMOS transistor switch with the template bit value stored on its gate; the switch allows or disallows the input current for channel m to be added to the total current for column n.

FIG. 5 shows an extremely compact dynamic circuit which can be used for the memory and switch. A value of $V_{dd}$ on the gate of transistor $M_2$ will cause the transistor to be completely off and pass no current. A value of $V_{dd}$ less approximately a volt or more will cause the transistor to be on, and pass the input current which is mirrored in transistor $M_1$. Transistor $M_3$ is used to write the bit value onto the storage capacitor (which is also a pMOS transistor), and can store a high bit value of $V_{dd}$ or a low bit value of approximately one transistor threshold. The capacitor stored value tends to leak toward $V_{dd}$, ensuring that an "off" state leaks zero current. An "on" state must be periodically refreshed. All N columns in a given row m are written or refreshed together.

The summation is performed over time dynamically using a bucket brigade device. This device is similar to a CCD line, but is more appropriate for this application, in which the system is clocked at a rate of 1 or 2 ms: while the charge-transfer efficiency in a bucket brigade is less than that of a CCD, the CCD is adversely affected by dark currents in the quiescent state and cannot operate at slow (auditory) rates. Large poly1-poly2 capacitors, which are significantly less affected by leakage currents than CCD capacitors, store the charge at each bucket brigade node.

Figure 6:
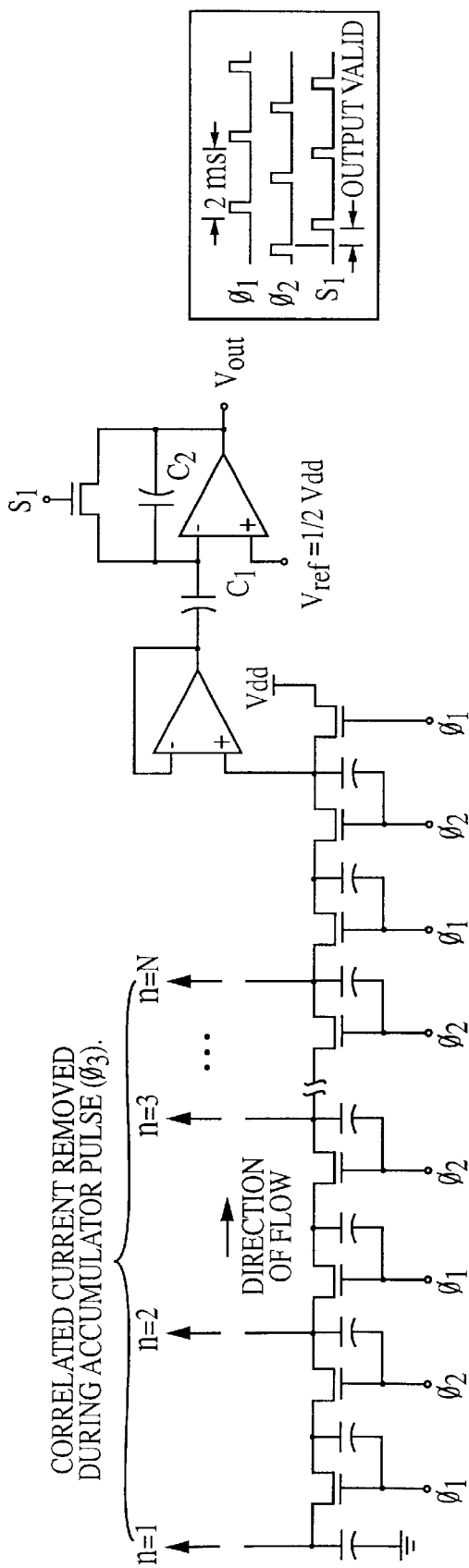
FIG. 6 illustrates the bucket brigade device (BBD).

FIG. 6 shows the bucket brigade line. It is driven by a nonoverlapping two-phase clock. Each BBD transistor's gate is coupled to its drain through a capacitor (preferably several hundred fF or greater). At the start of a cycle, the analog value to be transferred (a voltage measured negatively from $V_{dd}$) is stored on the transistor source, and a value of $V_{dd}-V_{th}$ is stored on the transistor drain, where $V_{th}$ is the transistor threshold voltage. The clock raises the gate-to-source voltage $V_{gs}$ of the transistor while ensuring a positive drain-to-source voltage $V_{ds}$, initiating current flow from drain to source.

Provided that the capacitors at drain and source of the transistor are the same size, the voltage drop at the drain will equal the voltage rise at the source. Current flow becomes negligible when $V_{gs}=V_{th}$. The final voltage at the source is therefore $V_{dd}-V_{th}$, and the final voltage at the drain, when the clock voltage returns to ground, is the value originally at the source.

In the bucket brigade accumulator, values are accumulated by integrating the summed current from each column of the correlator array off of the bucket brigade capacitor. The integration occurs over a constant amount of time determined by the pulse $\phi_3$. Since the input currents vary slowly with respect to the pulse width of $\phi_3$, the integration of current closely approximates a current-to-voltage conversion, resulting in a voltage drop at the bucket brigade stage proportional to the input current.

A simple single-transistor switch controlled by the signal $\phi_3$ (active low) enables the integration. This circuit is shown in FIG. 5. In order to prevent charge injection on the sensitive bucket brigade node, the transistor is switched via its source rather than its gate. When the source is grounded, the transistor mirrors the current from the correlator column.

One requirement of this scheme is that the current drawn from the bucket brigade stage must reach the value of the desired integrating current in a time which is short compared to the pulse width $\phi_3$, and must drop to zero in equally short time after the $\phi_3$ pulse ends. The parasite capacitance between the source and gate of $M_1$ will tend to pull down the gate voltage when the source is lowered. If the gate is part of a simple mirror, then the parasitic capacitance is charged directly by the input current, which is too small to meet the requirement. One solution to the problem is a MOS version of the Wilson current mirror, shown in FIG. 5. Transistor $M_5$ is 10 times wider than the other transistors, and can charge the parasitic capacitance quickly.

The output of the bucket brigade must be time-differenced. This is accomplished with the switched capacitor circuit shown in FIG. 6. The output is measured relative to the voltage $V_{ref}$, and scaled by the ratio $C_1/C_2$. The circuit must be reset by $S_1$ at the same frequency as the bucket brigade clocks. The output is valid between the $\phi_2$ and $S_1$ clocks. The bucket brigade is fully pipelined, yielding one full correlation at every time step.

The architecture of the invention uses an algorithm that correlates an analog value with a binary template. The incoming signal is not significantly compressed. Only the templates used for correlation are significantly compressed. Accordingly, the entire processing path from transduction until the accumulate-and-shift step can be performed in a fully analog, data-driven fashion.

The only clock that appears in the system is used for the analog shift register. This clock is very slow (about 10 kHz) as compared with conventional microprocessor speeds. The correlator array can be implemented as an array of cells bearing a strong resemblance to dynamic or static RAM cells. Thus, storing templates is as easy as loading conventional RAM, which is much easier than storing analog values in a floating gate array.

The frequency domain normalization used in the invention is essentially instantaneous compared with the characteristic time scales of the signal. Absolute intensity information is mostly thrown away, but at each instant, the relative amplitude of the frequency channels is preserved. Because of the normalization, all information in the transient is equally important, regardless of its intensity. Thus, low-intensity resonances that might be excited by the initial injection of energy are treated on the same footing as the loud onset of the transient. These resonances can contain significant information about the nature of the transient but would have less weight in an algorithm with a different normalization scheme.

Another consequence of the normalization is that even a transient whose spectrum is highly concentrated in just a few frequency channels will spread its information over the entire spectrum through the normalization denominator. The use of a normalized representation thus distributes the correlation calculation over very many frequency channels and thereby mitigates the effect of device mismatch.

We claim:

1. A mixed-mode very-large-scale integration (VLSI) device for real-time classification of acoustic transients by correlating an input signal comprising a plurality of input currents with a plurality of stored template values, the device comprising:

means for generating the plurality of input currents from collected acoustic transient data;

a normalizer for normalizing the plurality of input currents;

a switched-capacitor circuit for time and/or channel differencing the input currents;

a correlator array comprising a plurality of cells for receiving the plurality of normalized, time and/or channel differenced input currents and for comparing the input current received in each cell with the template value stored in each cell and for adding the input current to a total current if there is a match;

a bucket brigade device for summing the input currents added by the cells of the correlator array; and means for classifying the acoustic transients using an output of the bucket brigade device.

2. The device as recited in claim 1, wherein the switched-capacitor circuit time and/or channel differences the output of the bucket brigade device and the means for classifying uses the time and/or channel difference.

3. The device as recited in claims 1 or 2, the plurality of cells in the correlator array each comprising a transistor switch with the template value stored on its gate to allow or disallow the input current to be added to the total current.

4. A method for real-time classification of acoustic transients in mixed-mode very-large-scale integration (VLSI) comprising the steps of:

collecting acoustic transient data;

generating the input signal using the acoustic transient data;

normalizing the input signal;

computing the time and/or channel difference of the input signal;

taking a time difference of a plurality of stored template values, a pairwise difference between neighboring channels, or a combination thereof;

binarizing the stored template values;

correlating the binarized, stored template values with the normalized time and/or channel differenced input signal; and classifying the acoustic transients using an output of the correlating step.

5. The method as recited in claim 4, wherein the computing the time and/or channel difference of the input signal step is performed after the correlating step and the classifying step uses the time and/or channel difference.

6. The method as recited in claims 4 or 5, wherein the binarizing step comprises the step of replacing the stored template values with the sign of the time and/or channel differenced stored template values.

7. The method as recited in claim 6, wherein the binarized stored template values are made binary [0,1].

8. The method as recited in claim 7, the generating the input signal step comprising the steps of:

splitting, prior to the normalizing step, the input signal into a plurality of frequency bands; and computing a rectified energy envelope for each frequency band.

* * * * *